US012403822B2

(12) United States Patent
Schaye

(10) Patent No.: US 12,403,822 B2
(45) Date of Patent: Sep. 2, 2025

(54) VEHICLE ALERT SYSTEM

(71) Applicant: Pedestrian Safety Solutions, LLC, New York, NY (US)

(72) Inventor: Paul L. Schaye, Delray Beach, FL (US)

(73) Assignee: Pedestrian Safety Solutions, LLC, New York, NY (US)

( * ) Notice: Subject to any disclaimer, the term of this patent is extended or adjusted under 35 U.S.C. 154(b) by 0 days.

(21) Appl. No.: 19/039,198

(22) Filed: Jan. 28, 2025

(65) Prior Publication Data

US 2025/0256643 A1    Aug. 14, 2025

Related U.S. Application Data

(60) Provisional application No. 63/551,805, filed on Feb. 9, 2024.

(51) Int. Cl.
*B60Q 1/50* (2006.01)
*B60Q 1/26* (2006.01)
(Continued)

(52) U.S. Cl.
CPC ............. *B60Q 1/525* (2013.01); *B60Q 1/268* (2013.01); *B60Q 1/442* (2013.01); *F21S 43/14* (2018.01);
(Continued)

(58) Field of Classification Search
CPC ........ B60Q 1/525; B60Q 1/268; B60Q 1/442; B60Q 1/444; B60Q 1/445; B60Q 1/447;
(Continued)

(56) References Cited

U.S. PATENT DOCUMENTS 5,798,691 A    8/1998  Tim Kao
5,847,646 A *  12/1998  Mucciacciaro ........ B60Q 1/444
                                                        340/471
(Continued)

FOREIGN PATENT DOCUMENTS

CN    206 426 926 U    8/2017
DE    19616974 A1     10/1997
(Continued)

OTHER PUBLICATIONS

International Search Report and Written Opinion for Appln. No. PCT/US2025/014018, mailed Jan. 31, 2025, 19 pages.

*Primary Examiner* — Christopher E Dunay
(74) *Attorney, Agent, or Firm* — Dinsmore & Shohl LLP

(57) ABSTRACT

A vehicle alert system for instructing observers as to movement of the vehicle. A scoop adheres against an inside surface of a windshield and supports a plurality of illuminating elements communicating with a PCBA, along with each of an accelerometer, on board diagnostic system and a power supply. In response to a determined acceleration of the structure, the accelerometer inputs a signal to the PCBA representative of the vehicle movement and the PCBA in turn provides an output signal causing illuminating elements to generate a visual output corresponding to said input signal and further representative of a decelerating or braking condition of the vehicle. An ambient light sensor (ALS) can be incorporated into the assembly for managing lighting/LED intensity based upon exterior lighting conditions.

19 Claims, 18 Drawing Sheets

(51) Int. Cl.
  *B60Q 1/44* (2006.01)
  *F21S 43/14* (2018.01)
  *F21V 23/04* (2006.01)
  *F21S 43/15* (2018.01)
  *F21Y 115/10* (2016.01)

(52) U.S. Cl.
  CPC ...... *F21V 23/0464* (2013.01); *F21V 23/0492* (2013.01); *F21S 43/15* (2018.01); *F21Y 2115/10* (2016.08)

(58) Field of Classification Search
  CPC ... F21S 43/14; F21V 23/0464; F21V 23/0492
  See application file for complete search history.

(56) References Cited

U.S. PATENT DOCUMENTS

| | | |
|---|---|---|
| 7,397,355 B2 | 7/2008 | Tracy |
| 10,960,811 B2 | 3/2021 | Yi |
| 10,981,496 B2 | 4/2021 | Schaye |
| 11,325,530 B2 | 5/2022 | Yi |
| 11,524,628 B2 | 12/2022 | Takori et al. |
| 2006/0125615 A1 | 6/2006 | Song |
| 2006/0125616 A1 | 6/2006 | Song |
| 2006/0250229 A1 | 11/2006 | Cheng et al. |
| 2012/0287662 A1 | 11/2012 | Herberholt |
| 2014/0218190 A1* | 8/2014 | Prenger ............ B60Q 1/444 340/479 |
| 2017/0267164 A1* | 9/2017 | Muegge ............ B60Q 1/302 |
| 2017/0355303 A1* | 12/2017 | Reyes ............... F21S 43/255 |
| 2018/0170248 A1* | 6/2018 | Turnbull ........... B60Q 1/302 |
| 2018/0319326 A1* | 11/2018 | Daylong ........... F21S 43/14 |
| 2019/0217769 A1* | 7/2019 | Nekic ............... B60Q 1/302 |
| 2019/0241120 A1* | 8/2019 | Locey ............... B60Q 1/444 |
| 2019/0368680 A1 | 12/2019 | Belitz et al. |
| 2020/0282895 A1 | 9/2020 | Yi |
| 2020/0353862 A1 | 11/2020 | Schaye |
| 2020/0361370 A1* | 11/2020 | Wescott ............. B60Q 5/006 |

FOREIGN PATENT DOCUMENTS

| | | |
|---|---|---|
| FR | 2877894 A1 | 5/2006 |
| GB | 2337808 A | 12/1999 |

\* cited by examiner

VEHICLE ALERT SYSTEM

CROSS REFERENCE TO RELATED APPLICATIONS

The present application claims the priority of U.S. Ser. No. 63/551,805 filed Feb. 9, 2024.

FIELD OF THE INVENTION

The present invention relates generally to vehicle alert system. More specifically, the present invention teaches a vehicle system, such as which is attachable to a vehicle location not limited to a front windshield, for alerting pedestrians and other drivers as to the travel condition (slow or go) of the vehicle.

BACKGROUND OF THE INVENTION

The prior art is documented with examples of visual alert systems, such as which can be mounted to a vehicle for notifying pedestrians and other drivers as to a change in speed of a vehicle.

A first example is set forth in U.S. Pat. No. 10,981,496 to Schaye, and which teaches an apparatus for indicating vehicle deceleration. A housing is visible from a front of the vehicle and which incorporates a printed circuit board, an electrical connection and an accelerometer for signaling a plurality of LEDs to instruct the braking condition of the vehicle. An associated method is disclosed for creating a lighting pattern on a light strip associated with the LEDs for instructing a change in the vehicle's operating condition, such as deceleration which is indicative of a braking condition.

U.S. Pat. No. 11,524,628, to Takori et al., teaches a notification device in a vehicle which enables a person outside the vehicle to be notified of a predetermined operating state of the vehicle by its light emission. A plurality of spot-shaped light sources are arranged at intervals to follow an upper edge of a windshield, a reflecting part reflecting light from the light sources to a front. An outer lens transmits therethrough the light heading toward the front from the reflecting part. The outer lens has on at least one of front and rear faces thereof a fine concave-convex face diffusing the light transmitted through the outer lens.

Also referenced are the accessory brake light system of Tim Kao (U.S. Pat. No. 5,798,6910, the vehicle accelerator and brake indicators of Song (US 2006/0125615), the advance warning system of Cheng (US 2006/0250229) and the vehicle acceleration/deceleration warning light of Tracy (U.S. Pat. No. 7,397,355). In each instance, a lighting assembly is incorporated into a housing of some type, which is mounted at a given location of a vehicle.

SUMMARY OF THE INVENTION

The present invention discloses a visual alert system for instructing pedestrians or other drivers (collectively observers) as to the movement of a subject vehicle. Specifically, and according to the non-limited illustrated embodiment, the alert system indicates to the observer(s) located forward of the subject vehicle as to whether the vehicle is maintaining a given speed, accelerating or decelerating, in the latter case being further indicative of a braking condition.

The alert system includes a three dimensional triangular shaped body configured as a scoop portion having flattened edge extending perimeter portions which, in a first non-limited application, adhere (such as adhesively) against an inside surface of the front windshield. As will be further described, the body can be reconfigured/relocated to other vehicle locations not limited to the hood, grill, review mirror, roof etc.

The scoop portion is open along its width extending rear and supports a separate module containing a plurality of illuminating elements, such as LED elements, which are arranged so as to illuminate through a forward located lens subassembly integrated into a forward portion of the module which is seated within the scoop portion. Also integrated into the module is a rearward portion including wiring connections extending to a PC board assembly (also PCBA) with built in accelerometer or access to the existing vehicle on-board diagnostic (OBD) network for illuminating the LED's based on the vehicle movement. This includes the PCBA instructing a first visual output by the LED's representative of a first steady or accelerating movement condition, with a second instructed visual output further representative of a decelerating or braking condition of the subject vehicle.

An electrical power supply is provided to module and, in a first application, includes additional connections extending between the PCBA and a battery of the vehicle. In a further application, a portable battery can be substituted for a dedicated hookup connection for powering the PCBA, accelerometer and LEDs.

In alternate variants the separate rear module can be incorporated into the main forward body (also scoop shaped portion), containing the plurality of illuminating elements, PCBA, accelerometer or vehicle on board diagnostic (OBD) system connected to the PCBA, and power supply operating the accelerometer and PCBA and which, in response to a determined acceleration, the accelerometer or OBD inputting a signal to the PCBA which is representative of the vehicle movement, with the PCBA providing an output signal causing said illuminating elements to generate a visual output broadcasted forwardly through the scoop portion corresponding to the input signal.

An ambient light sensor (ALS) can be incorporated into the assembly for managing lighting/LED intensity based upon exterior lighting conditions. Without limitation, the ALS can be located upon any of a laminated circuit, PCBA controller or existing automotive system.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 2:
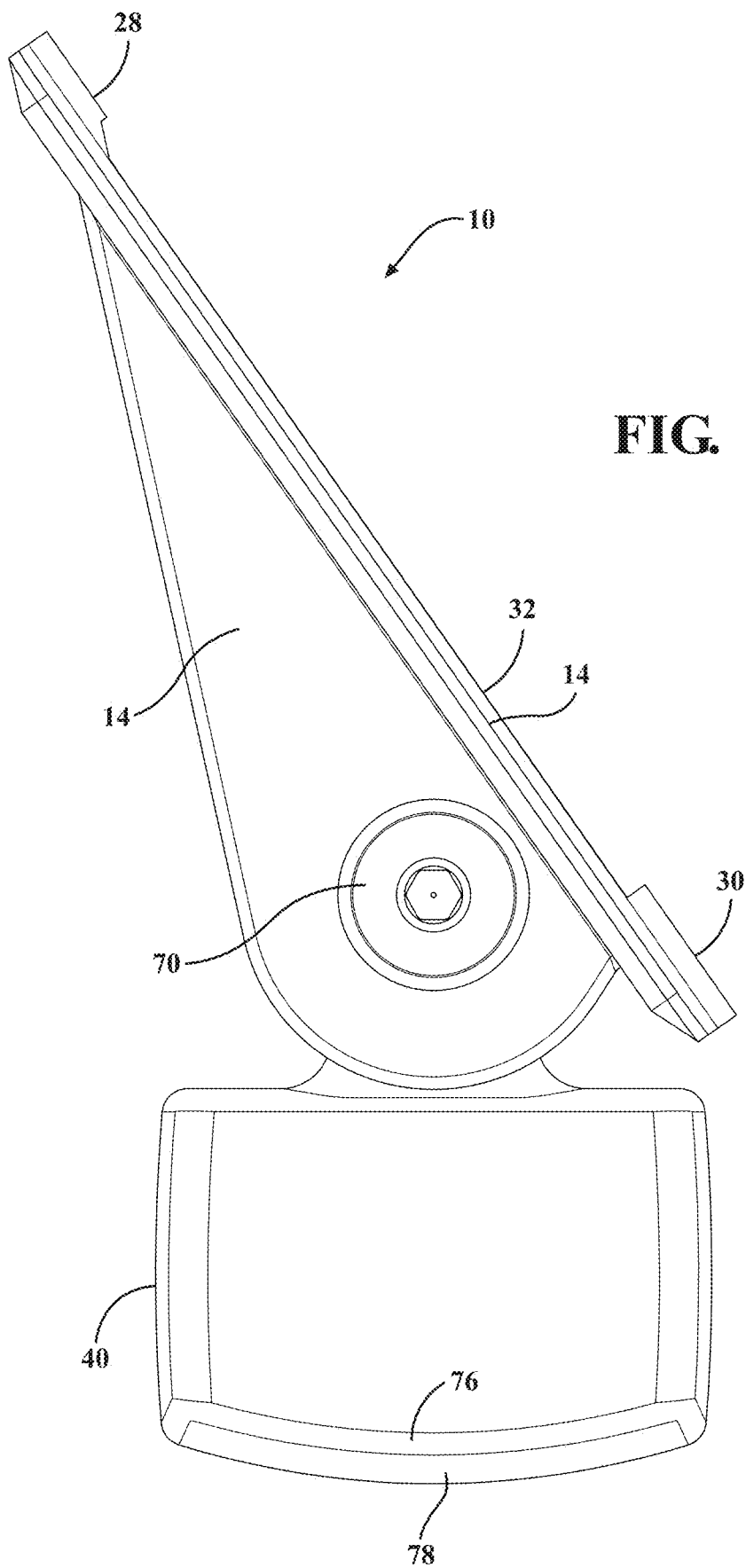
FIG. 2 is a side view of the vehicle alert system in an assembled configuration.
Figure 3:
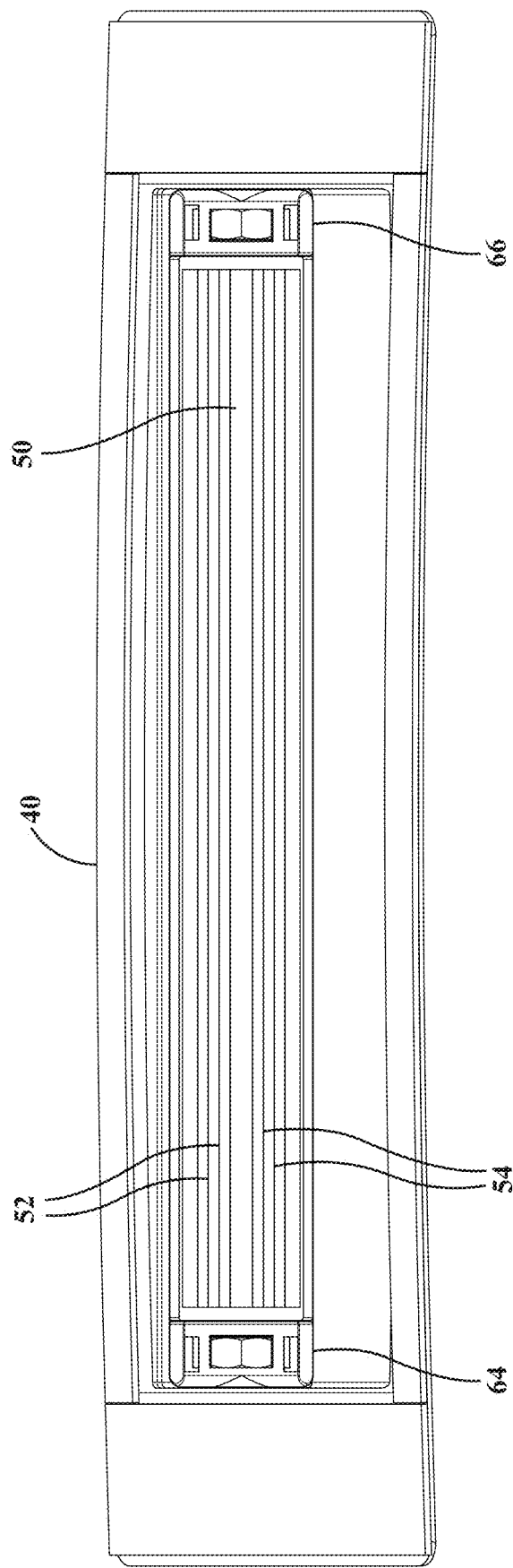
FIG. 3 is a front view of the system of FIG. 2 and depicting the forward lens subassembly for distributing the illumination from the LED elements.
Figure 4:
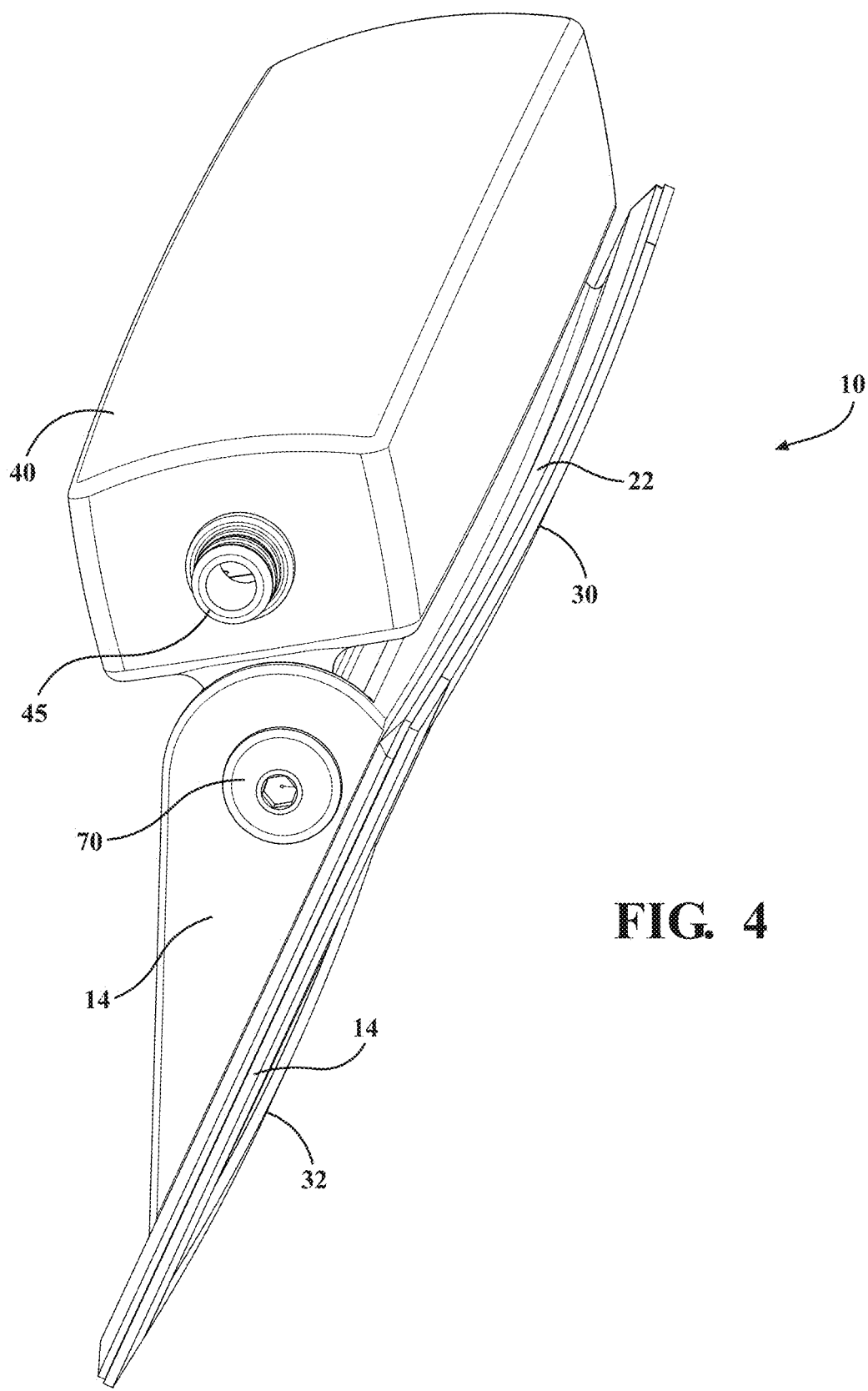
FIG. 4 is a rotated perspective of the vehicle alert system shown in FIGS. 2-3 and better illustrating the mounting arrangement established between the triangular shaped scoop portion and the separately supported module from a rear side exterior angle.
Figure 5:
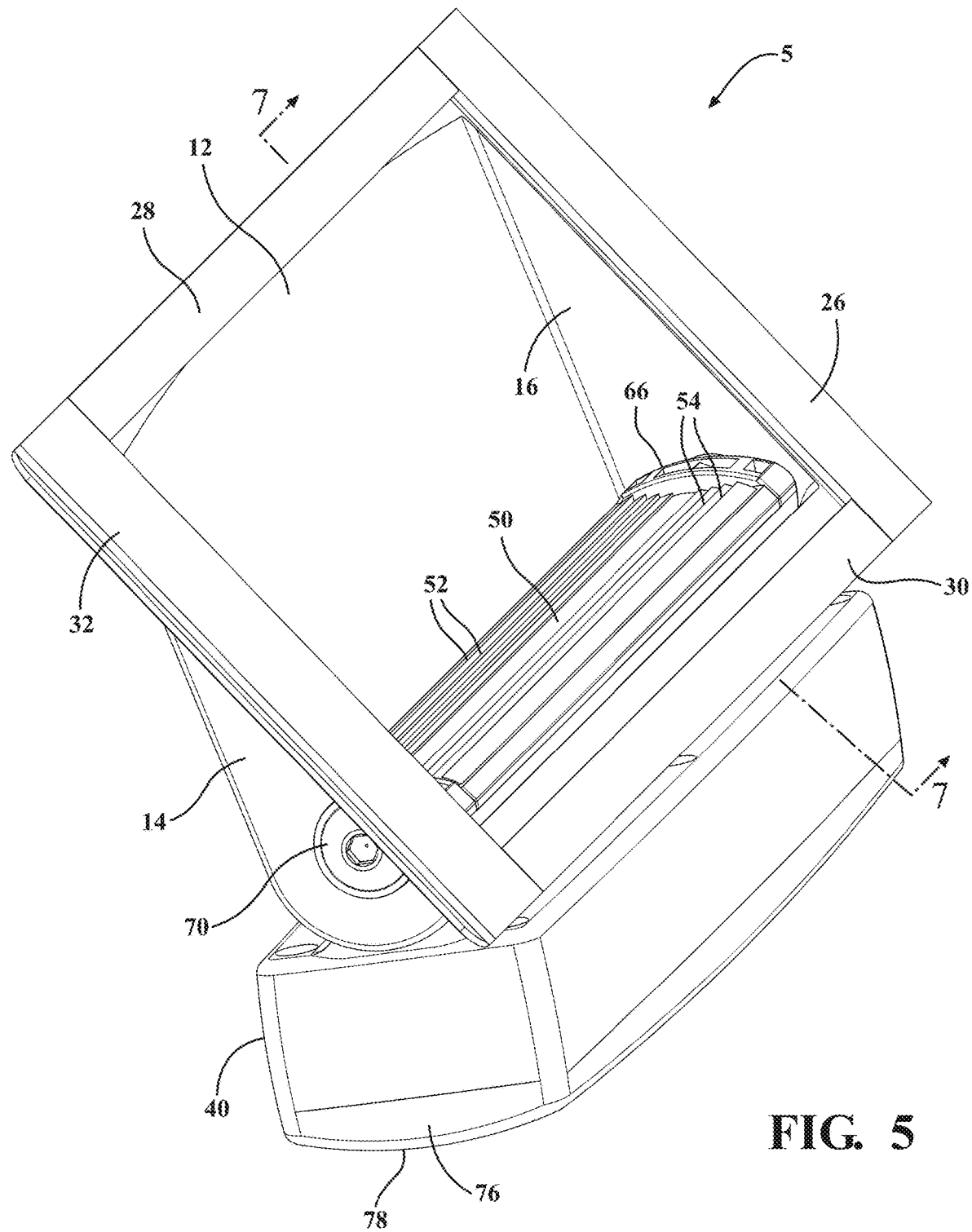
FIG. 5 is a one hundred and eighty degree rotated illustration of the vehicle alert system shown in FIG. 4.
Figure 6:
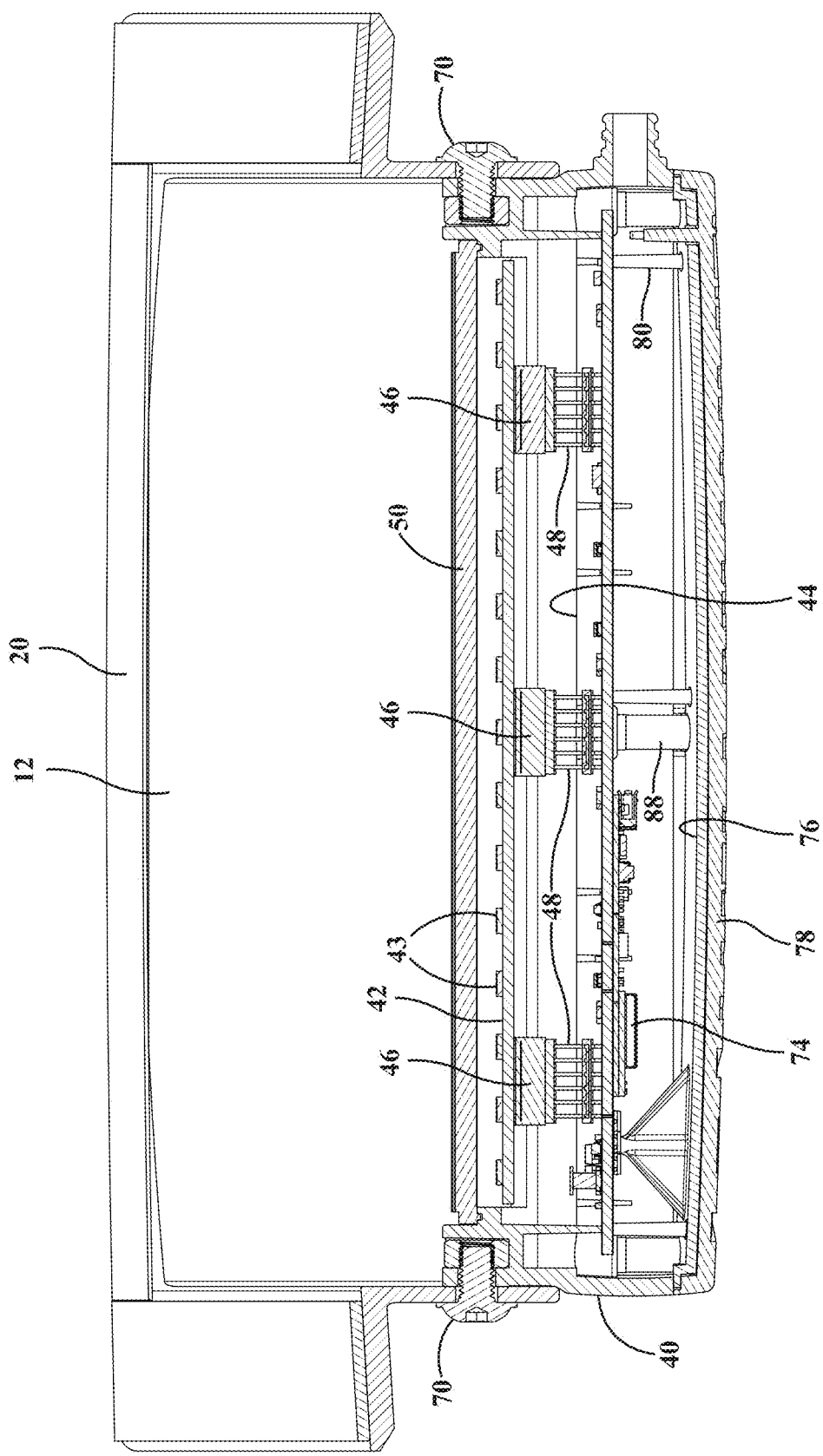
FIG. 6 is a cutaway view taken along line 6-6 of FIG. 3 and better illustrating the PCBA, pin connections and interior support structure of the module.

With reference to the attached illustrations, the present invention discloses a visual alert system (generally at 10 in FIGS. 2, 4-5, etc.) for instructing pedestrians or other drivers (collectively TERMED observers) as to the movement of a subject vehicle. Specifically, and as will be further described herein, the alert system can be positioned at a number of alternate locations of the vehicle.

In the illustrated embodiment, the system and assembly is constructed attached to an underside of the vehicle windshield 2 (FIGS. 11A-14 and 20), and operates as a vehicle front alert (or VFAS) system for indicating, to observer(s) located forward of the subject vehicle, as to whether the vehicle is accelerating, maintaining a given speed or is decelerating, in the latter instance being indicative of a braking or other reducing-speed condition.

As will be further described, two non-limiting embodiments of the visual front alert system are shown, again at 10 (FIGS. 1-10) and further at 100 (FIGS. 11-21). Respective descriptions of both embodiments will be provided as follows, with relative differences in their structures being addressed.

Figure 1:
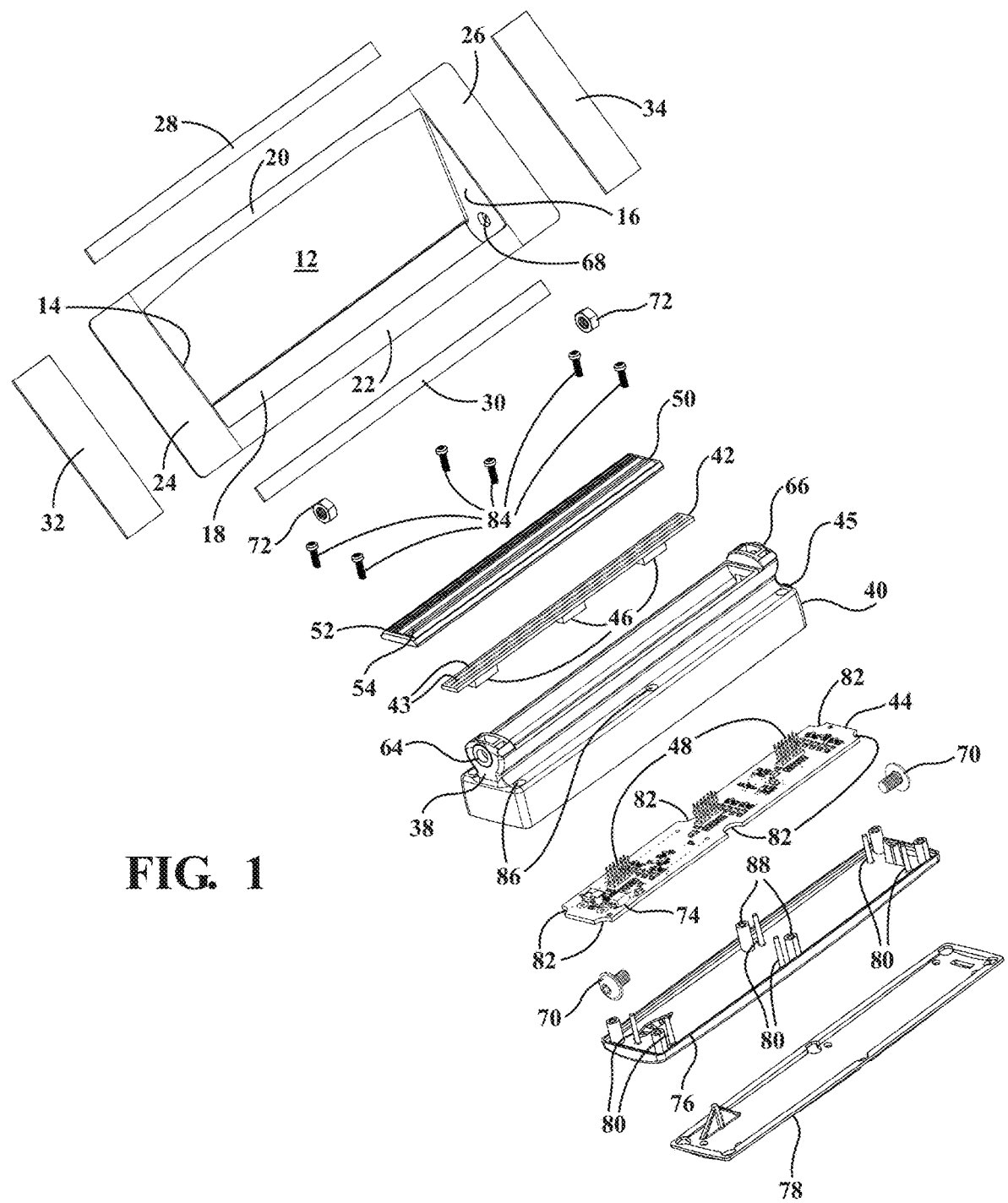
FIG. 1 is an exploded illustration of a vehicle alert system according to an embodiment of the present invention.

Referencing first FIG. 1, an exploded illustration is provided of the vehicle alert system 10 according to an embodiment of the present invention. A body of the assembly is provided as a triangular three dimensional shaped and depth defining scoop portion including a central depth extending and interior surface 12 which is bounded by interior triangular shaped and progress depth defining sides 14 and 16 extending to a maximum depth defined curved rear 18.

Flattened perimeter extending edges 20, 22, 24 and 26 define an outer perimeter frame of the scoop portion. In order to adhere the scoop portion to the inside surface of the windshield, a matching series of two sided adhesive portions, see at 28, 30, 32 and 34, are provided which correspond in shape and size to each of the flattened perimeter extending edges 20, 22, 24 and 26.

Figure 14:
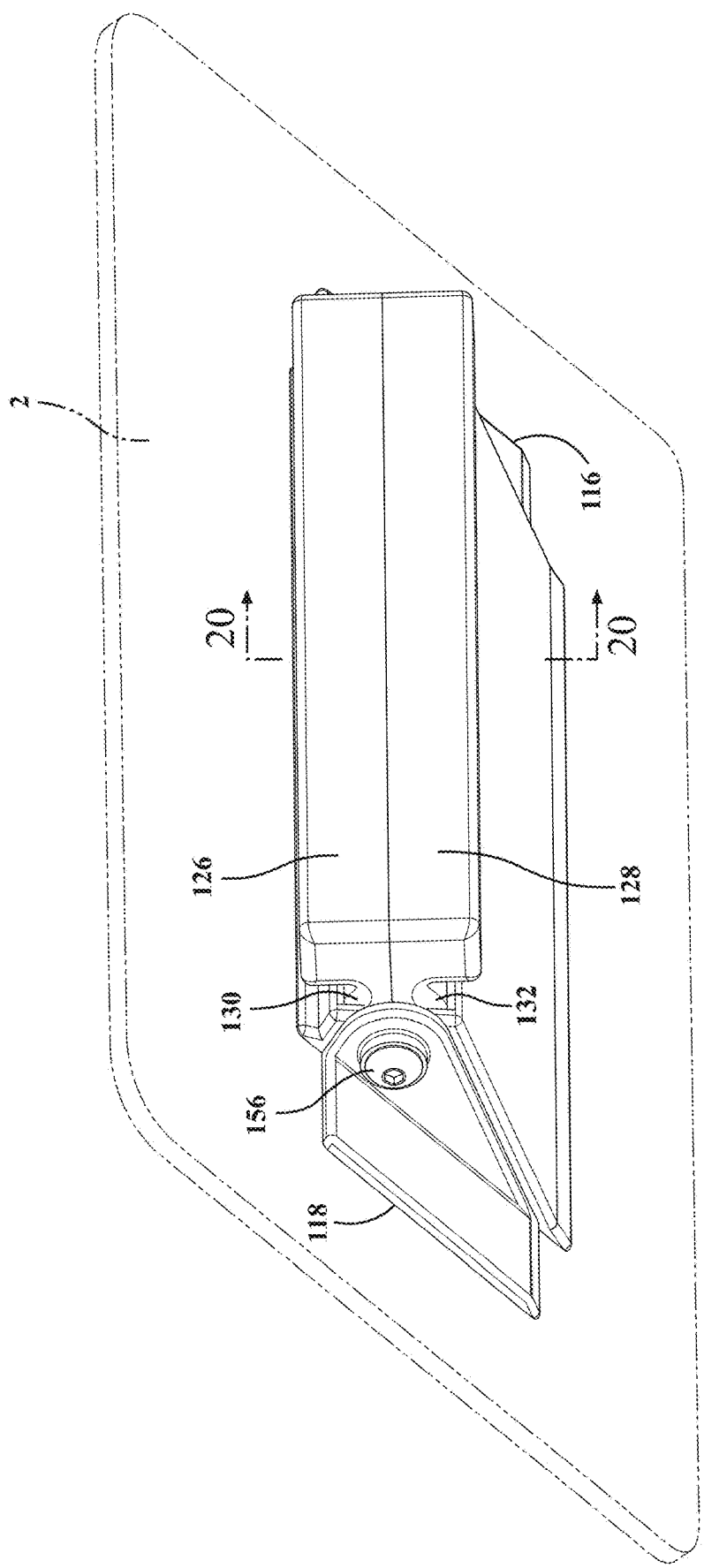
FIG. 14 is a rotated rear perspective view of the vehicle alert system as shown in FIG. 13A.

In use, the adhesive portions secure the scoop about its flattened perimeter against the inside surface of the front windshield 2 (see also for related variant 100 as depicted in FIG. 14), and prevents light emitted from the assembly from reflecting from the windshield 2 into the eyes of the driver or passenger. As will be described in further detail, and without limitation, the scoop portion can be reconfigured to mount to anywhere on the vehicle not limited to any of the hood, grill, bumper, rearview mirror, roof, and the like and can also be reshaped from that shown.

The scoop portion and associated underside perimeter extending portions can be constructed of any material including without limitation a lightweight polymer material. Alternative to utilizing the two sided adhesive portions 28, 30, 32 and 34, the flattened and outer perimeter surfaces frame defining portions 20, 22, 24 and 26 opposing the windshield underside can themselves exhibit any adhesive or tacky composition with provides for secure and releasable engagement against the windshield underside. In alternate applications, the scoop portion may be reconfigured as needed for mounting to any forward or rearward facing location of the vehicle, again not limited to the hood, grill, bumper, rearview mirror, roof, trunk or the like.

The scoop portion is open along its width extending rear, which is largely obscured in FIG. 1 but understood as defining a rear interior perimeter 36 (see FIG. 7 side cutaway) incorporated into the curved rear 18. The rear interior perimeter or window supports a forward portion 38 of a separate module 40 containing a width extending component 4 which arrays a plurality of forward facing illuminating elements (see LED elements 43 as better shown in FIG. 9) installed to the module. The illuminating elements communicate with a printed circuit board assembly (PCBA) 44. The plurality of illuminating elements further include LED elements which are mounted to the width extending strip or component 42 having reverse side facing receiving sockets 46 which mount to segregated sub-pluralities of pins 48 extending from an opposing forward facing side of the PCBA 44. In operation, and as shown in the non-limited illustrated embodiment, the configuration of the scoop portion, upon being adhered to the inside surface of the windshield, prevents illumination from the LEDs from reflecting back from the windshield 2 and into the eyes of the vehicle driver.

Figure 9:
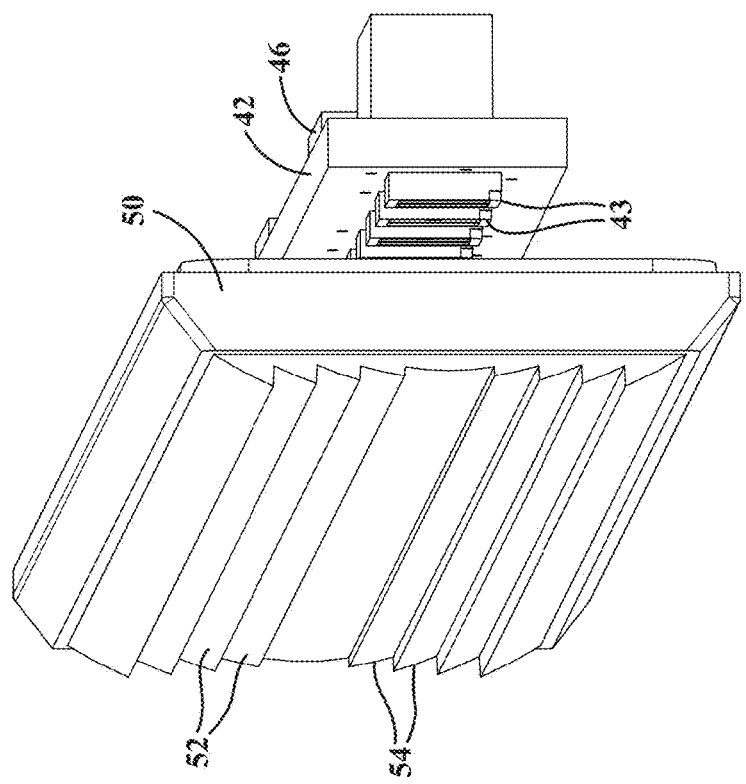
FIG. 9 is an enlarged sectional view depicting the subset combination of the lens and LED supporting component for establishing an illumination profile for the illuminating elements.
Figure 11A:
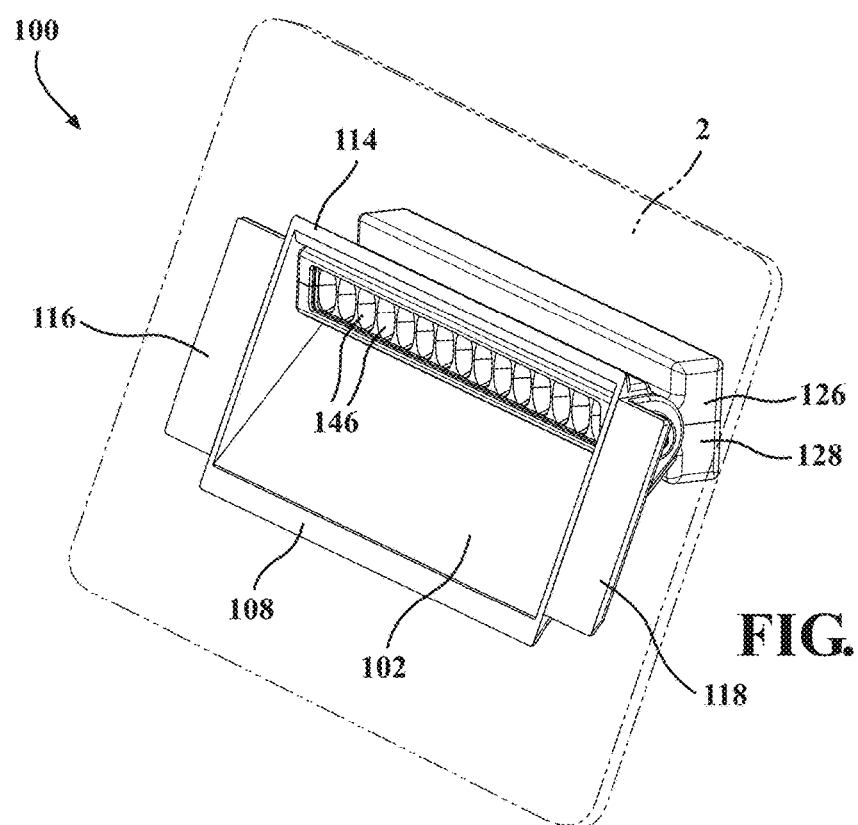
FIGS. 11A-11B, 12A-12B and 13A-13B provide respective first perspective and second side line art views similar to that previously shown in FIGS. 8A-8B and better depicting a multi-angular range of adjustability established between the triangular shaped scoop portion and attached module according to a further embodiment of the present invention.
Figure 11B:
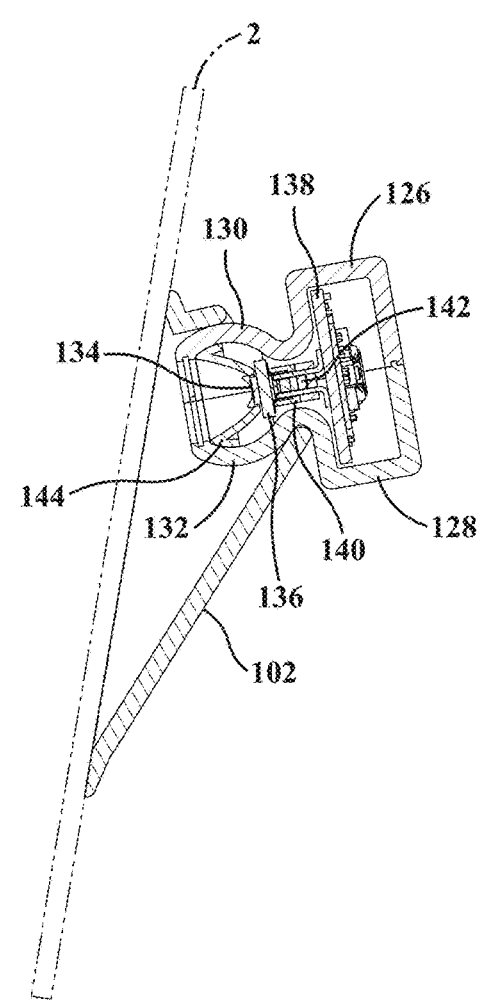
Figure 12A:
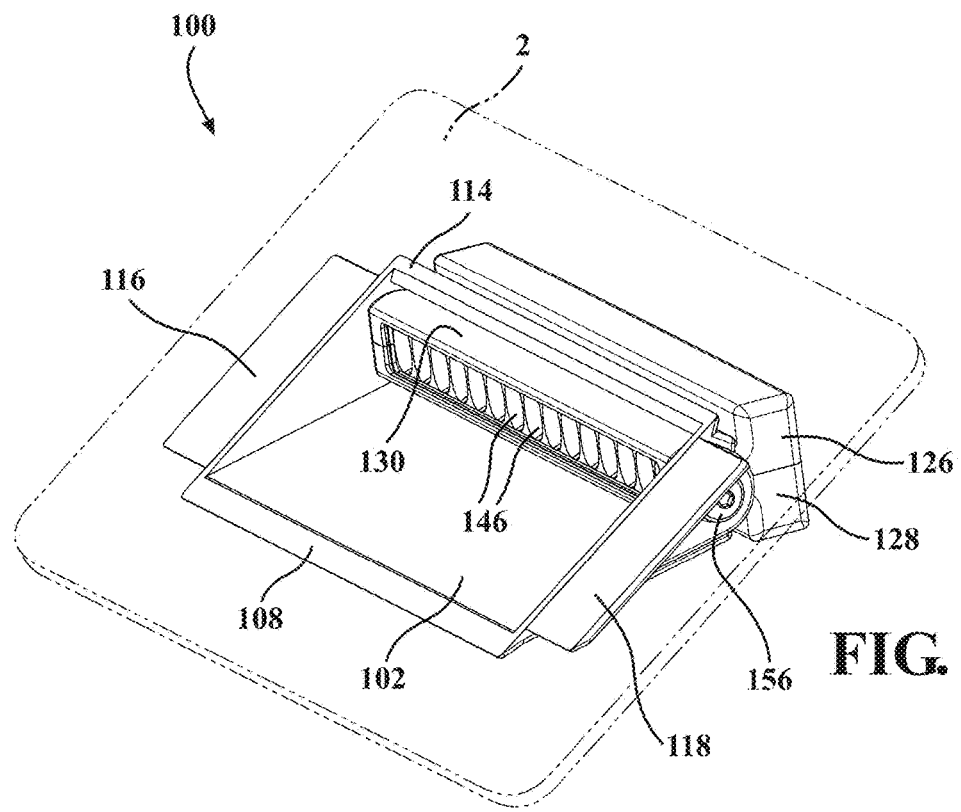
Figure 12B:
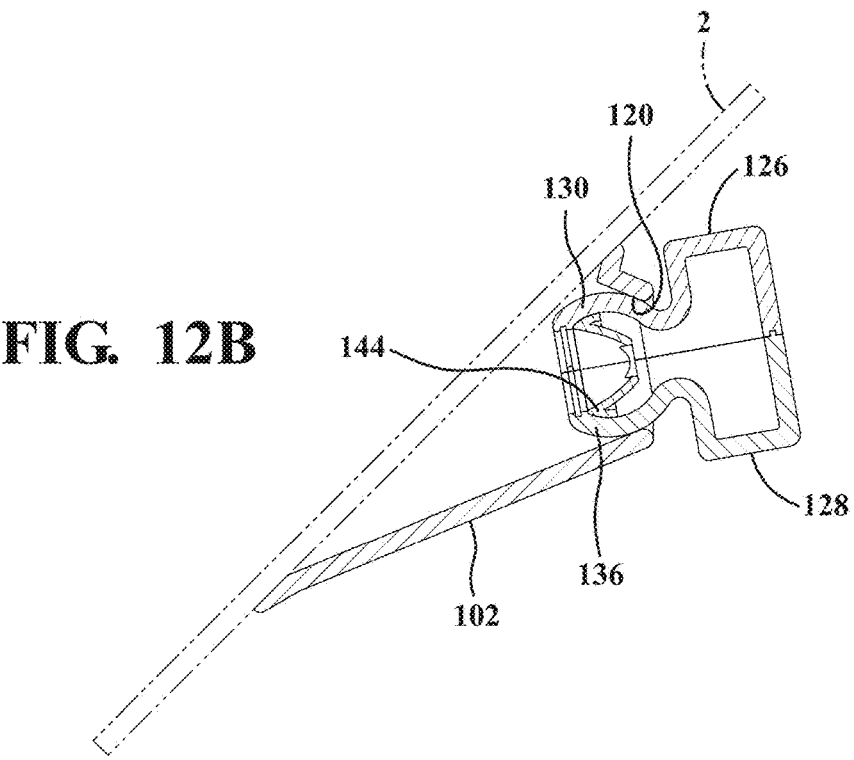
Figure 13A:
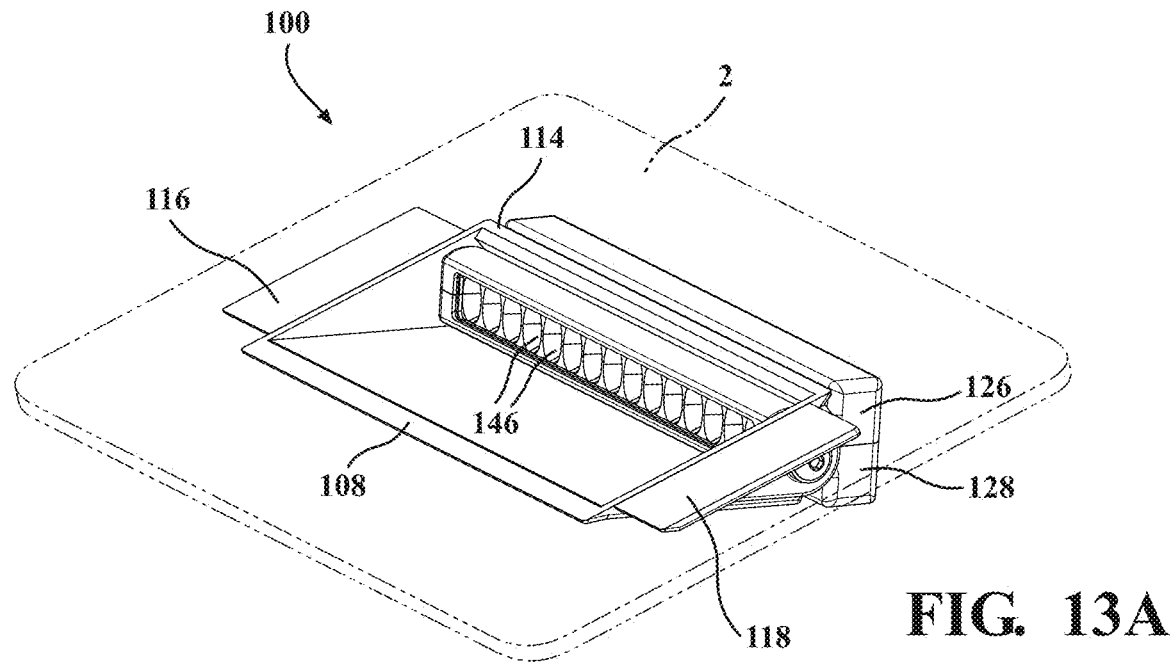
Figure 13B:
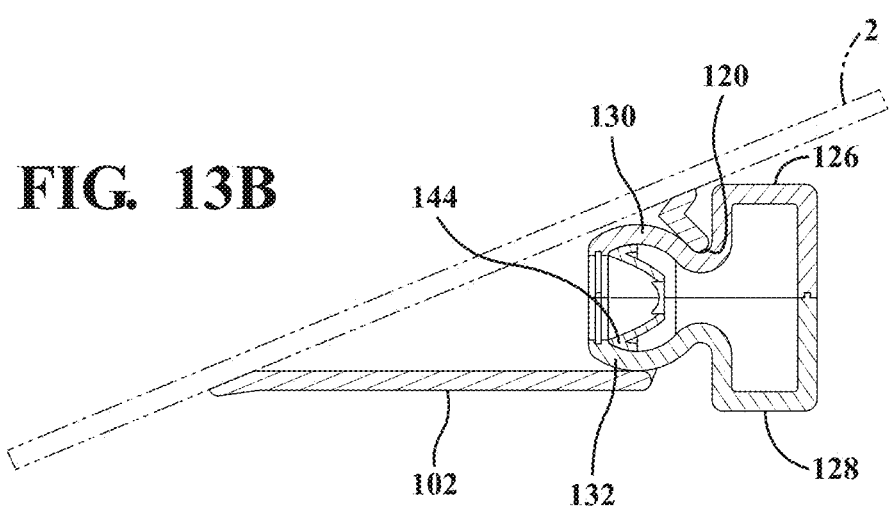

An elongated and width extending lens subassembly 50 is provided and integrates into the forward portion 38 of the module 40 so that it is seated through the rear profile defining and curved window 36 defined within the triangular shaped scoop portion. As best depicted in FIG. 9, an enlarged sectional view is shown depicting the subset combination of the lens 50 and LED supporting strip component 42 (see also again the plurality of forward facing LED or illuminating elements 43 which are better shown) for establishing an illumination profile for the illuminating elements. As further shown in succeeding FIG. 10, the lens 50 includes upper 52 and lower 54 offset deflecting portions or surfaces for maximizing an angular range of the illuminating elements (depicted as ranging from 53.7° to 110.0° in FIG. 10) from the lens.

Figure 7:
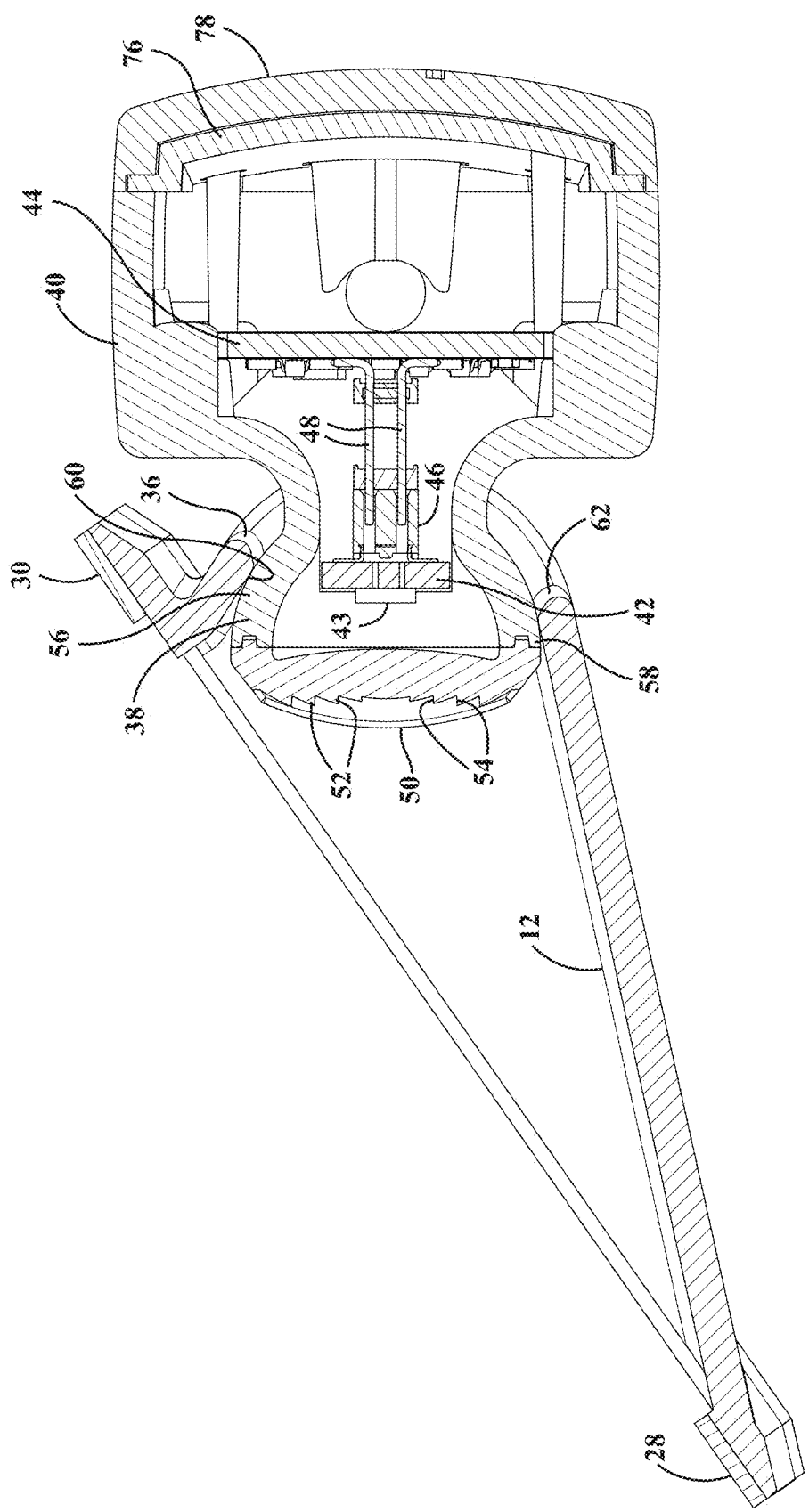
FIG. 7 is an illustration similar to FIG. 2 and cutaway along line 7-7 of FIG. 5.
Figure 8A:
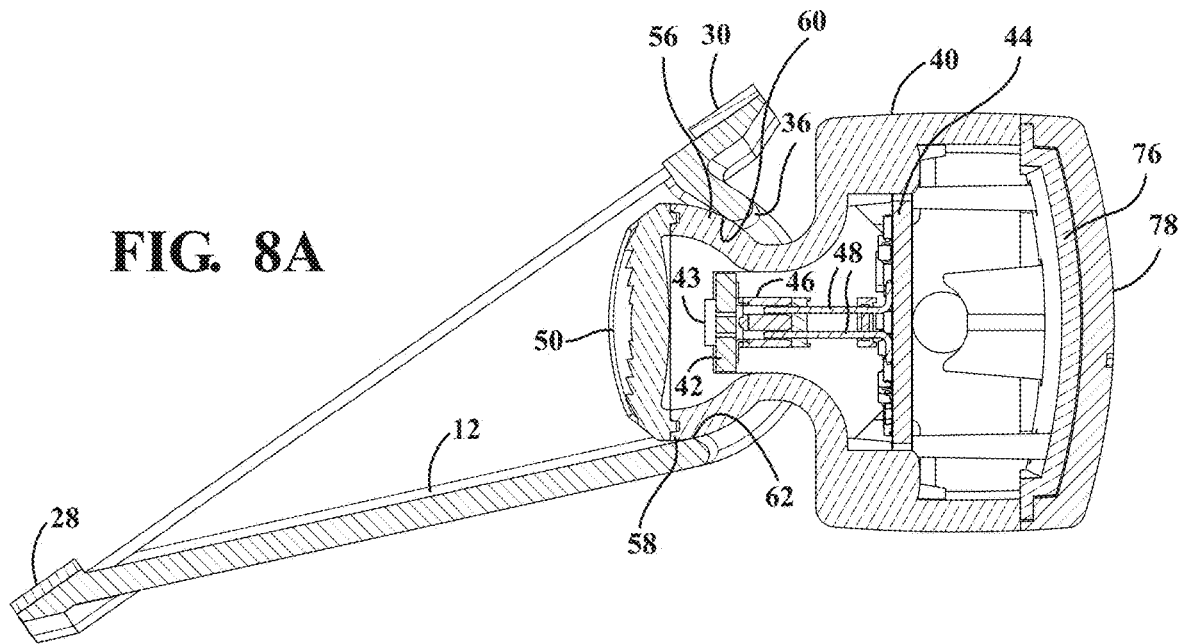
FIGS. 8A and 8B illustrate the rotational adjustability of the LED containing module relative to the windshield supported triangular shaped scoop portion.
Figure 8B:
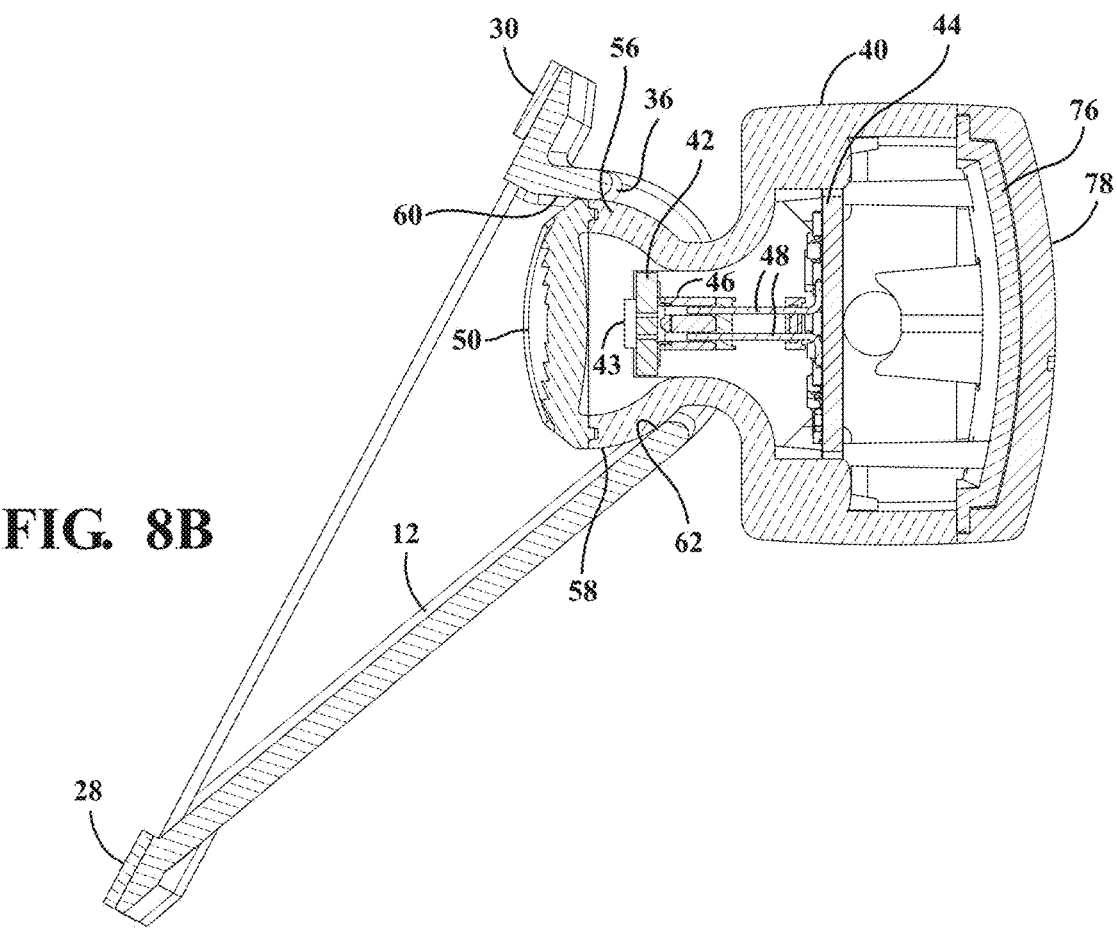
Figure 10:
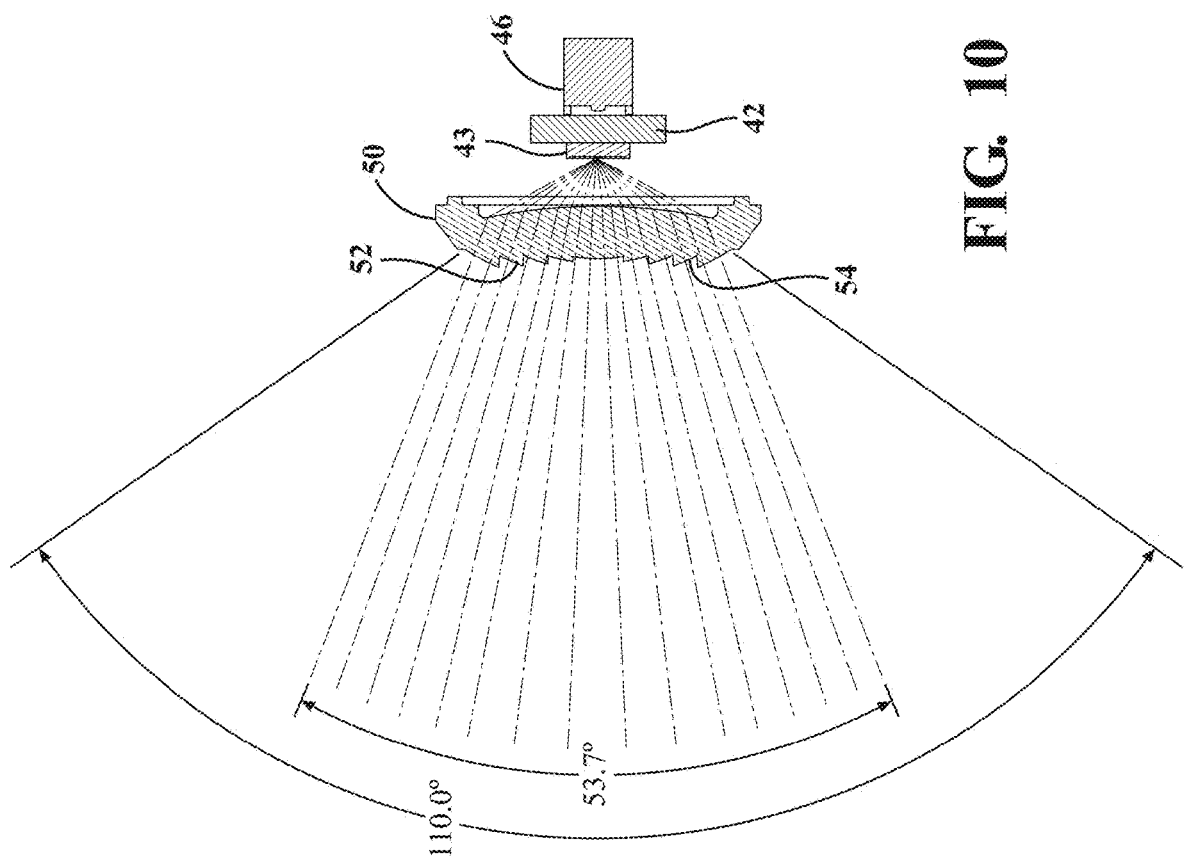
FIG. 10 presents a successor view to FIG. 9 and depicting an angular range of illumination from the lens.

As best shown in the cutaway view of FIG. 7, the lens 50 is mounted to the forward portion 38 of the module 40. The forward portion 38 again depicts upper and lower curved profiles (see at 56 and 58) which coact with opposing support surfaces (at 60 and 62) of the scoop portion 12, these again located contiguous to the rear window opening 36 in order to provide a range of angular adjustability. This is also shown in FIGS. 8A-8B in which the scoop portion can adapt to different surface configurations of the windshield in order to provide for optimal orientation of the illuminating elements 26.

As best shown again in FIG. 1, the pivotal supporting aspect between the scoop portion 12 and module 40 is facilitated by coaxial apertures 64/66 defined at opposite ends of the module forward portion 38 which seat within seating apertures (on of which is shown at 68) within the ends 14/16 of the scoop portion via a pair of bolts 70 and nuts 72 in order to affix the module 40 to the windshield mounted scoop portion 12.

An accelerometer (by non-limiting example at 74 in FIG. 1) can be connected to or incorporated into the printed circuit board assembly (PCBA) 44. A power supply operates the accelerometer and PCBA 44 and can be either integrated into a headliner of the vehicle (not shown) which connects to the vehicle battery and is routed to the PCBA 44 via a side port 45 configured into the module 40 (se also rotated assembled view of FIG. 4). Alternatively, the power supply can be provided by such as an alkaline, Lithium ion or Nickel Cadmium battery which is insertable into the module 40.

Referencing again FIG. 1, additional package defining components include a rear cover 76 and PCBA support plate 78 for the module 40. The rear cover 76 includes locating posts 80 which seat or locate aligning notched edge locations 82 of the PCBA 44. Pluralities of mounting rivets or screw fasteners 84 are also depicted in FIG. 1 which mount through perimeter spaced apertures 86 in the module 40 and, with the fastener stems engaging mounting projections 88 integrated into the rear cover for completing the assembly.

In response to a determined acceleration of the structure, the accelerometer inputs a signal to the PCBA 44, which is representative of the vehicle movement, with the PCBA providing an output signal causing the illuminating elements to generate a visual output corresponding to the input signal for broadcasting through the lens 50. Without limitation, additional or alternative mechanisms to the accelerometer can be utilized as part of the present invention and which communicate with the PCBA in providing the necessary speed data from the relevant vehicle network. Without limitation, this can include utilizing an existing vehicle processor network, also identified as an OBD or on-board diagnostics system, and which is defined as computer system inside of a vehicle that tracks and regulates a car's performance. The on-board computer system collects information from the network of sensors inside the vehicle (and which can include speed and acceleration), which the system can then use to regulate car systems or alert the user to problems.

Proceeding to FIGS. 11A-11B, 12A-12B and 13A-13B, provided are respective first perspective and second side line art views similar to that previously shown in FIGS. 8A-8B and better depicting a multi-angular range of adjustability established between the triangular shaped scoop portion and attached module, this according to the further embodiment 100 of the present invention.

With reference to each of the assembled perspective (FIG. 14) and exploded (FIG. 15) views, the vehicle alert system 100 is largely similar to that previously described in FIGS. 1-10 and includes a generally three dimensional and triangular shaped scoop portion with a flattened inner surface 102, along with triangular shaped end surfaces 104/106, and again having flattened upper edge extending perimeter portions (front 108, sides 110 and 112, and rear 114), which frame an outer perimeter of the scoop to adhere (such as again adhesively) against an inside surface of the front windshield 2.

Side located support brackets 116 and 118 are provided which can be configured to mount to the sides of the scoop portion and which can also include an adhesive or tacky surface in order to adhere to any curvature (or flat and non-curvature) of the windshield 2. As with the initial embodiment 10, the scoop portion and associated underside adhering portions corresponding to the perimeter defining surfaces (collectively 108/110 and 116/118 of the side brackets) and can be constructed of any material including without limitation a lightweight polymer material.

Figure 15:
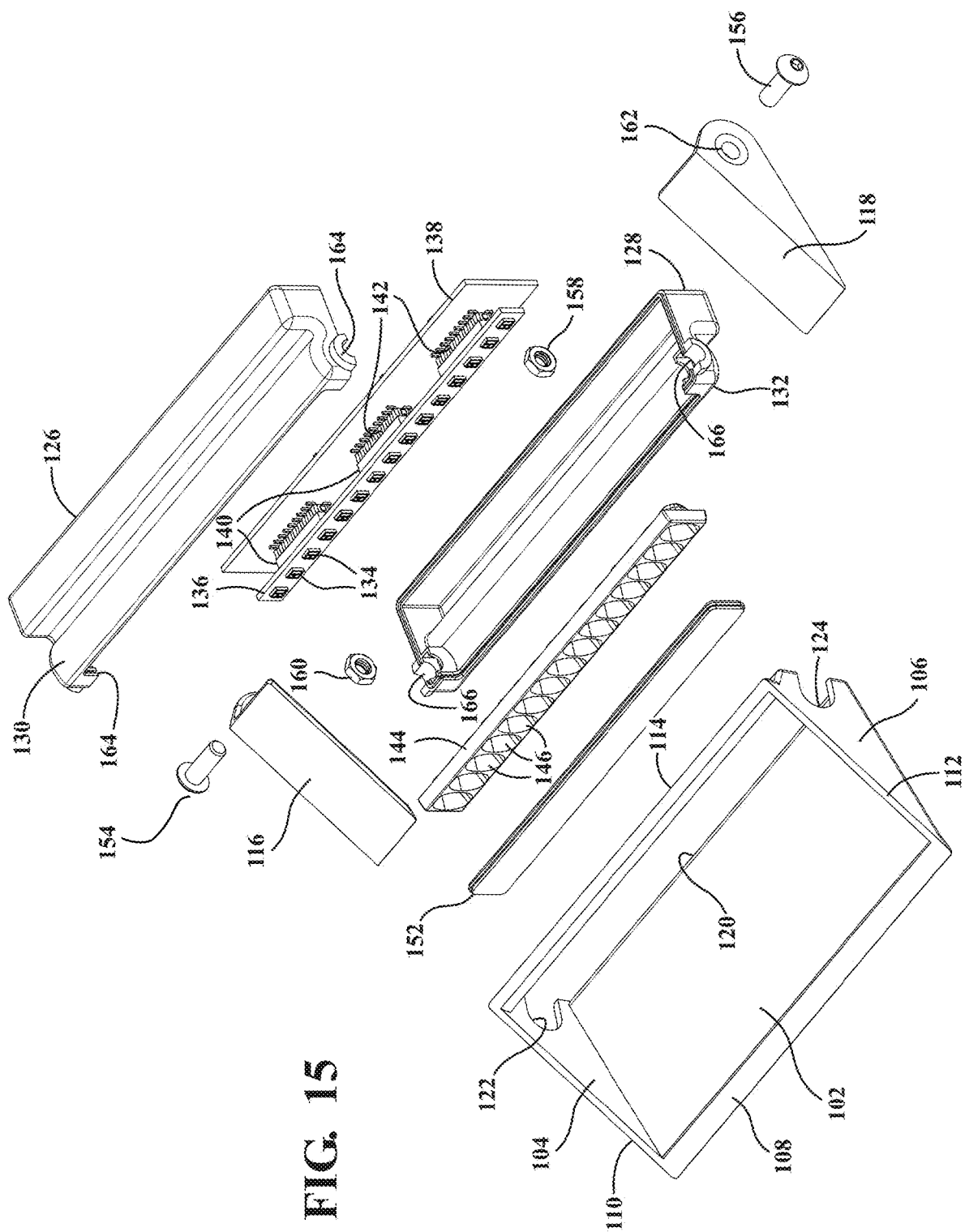
FIG. 15 presents an exploded view of a vehicle alert system, as compared to that previously shown in FIG. 1, according to the further embodiment of the present invention.
Figure 20:
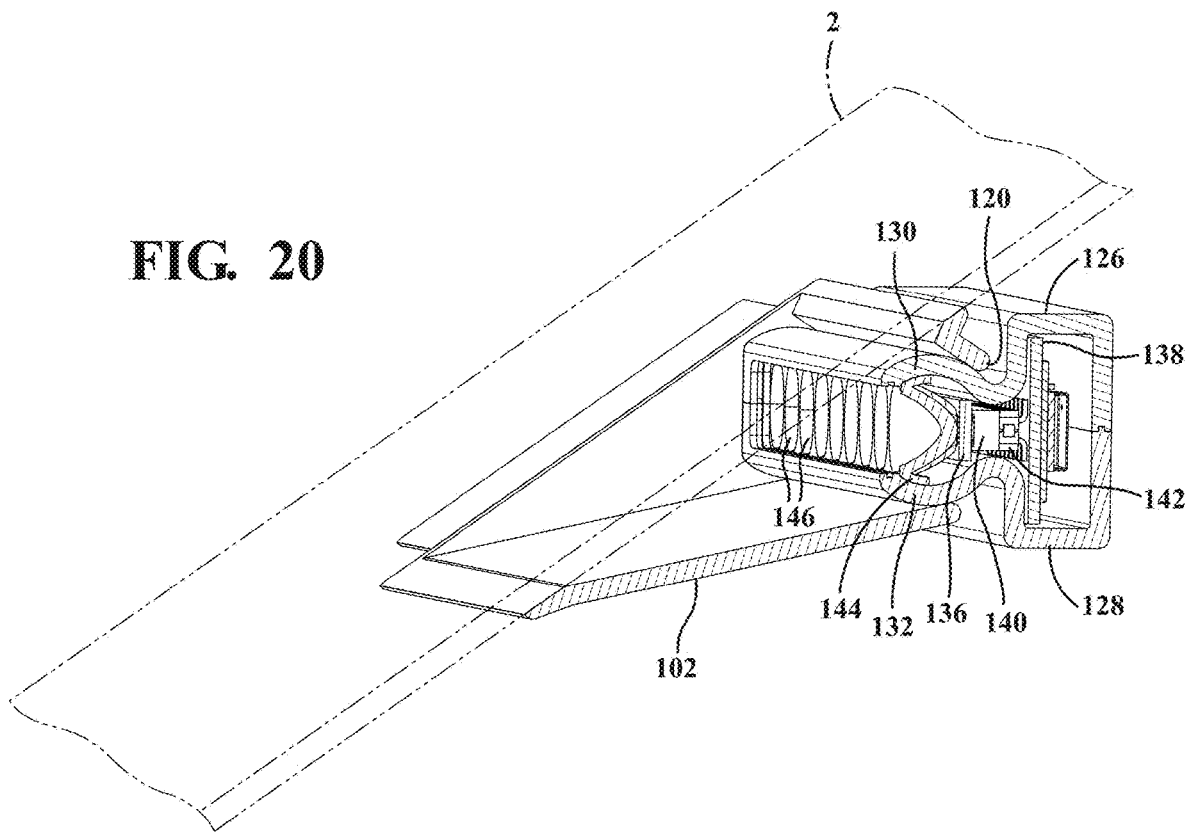
FIG. 20 is a perspective cutaway view of the vehicle alert system taken along line 20-20 of FIG. 14.
Figure 21:
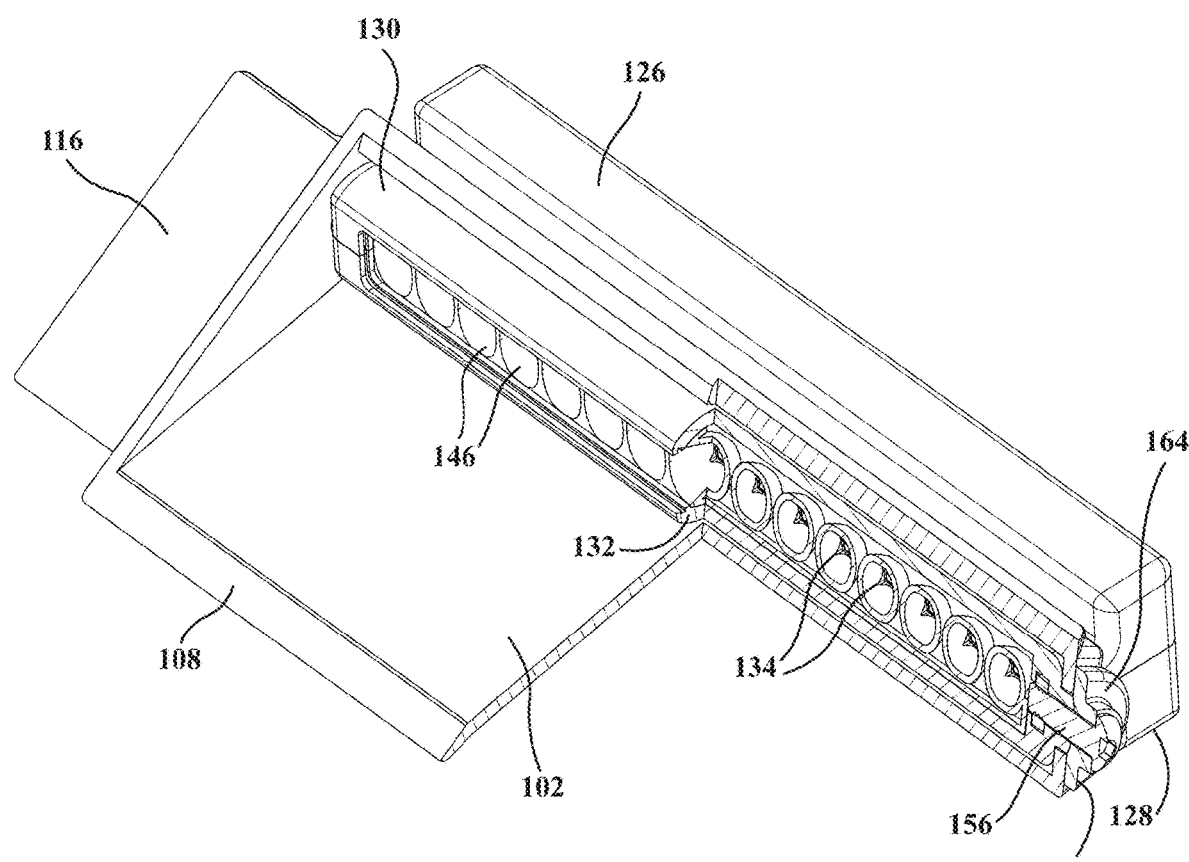
FIG. 21 presents a further rotated and modified cutaway view of the vehicle alert system of FIG. 11 et seq. and better illustrating the modified construction of the LED supporting lens in comparison to that shown in the initial embodiment of FIGS. 1-10.

Referencing again FIG. 15, the scoop portion 102 is open along its width extending rear (this better shown by perimeter extending open rear profile 120 defined along the rear end of the scoop portion 102 which communicates with curved end profiles 122 and 124 for seating a forward portion of the rear attached component module. The separate module in this embodiment is reconfigured as a two piece upper 126 and lower 128 assembleable housings, each of which includes forward arcuate portions, at 130 and 132 respectively which, upon assembly, seat interiorly through the rear opening in the scoop portion 102 (see as best shown in the cutaway of FIGS. 20-21).

The module contains a plurality of illuminating elements 134 which can be mounted in spaced apart fashion upon a strip component 136, in turn communicating with a printed circuit board assembly (PCBA) 138. The plurality of illuminating elements 134 in the preferred embodiment again can include LED elements which are mounted to the width extending strip component 136 having reverse side facing receiving sockets 140 which mount to segregated subpluralities of pins 142 extending from an opposing forward facing side of the PCBA 138.

Without limitation, the scoop shaped portion or body 102 can be redesigned according to any desired shape beyond the scoop configuration depicted, which can also include the separate module likewise being redesigned so as to optionally be integrated directly into the reconfiguration of the body secured to the vehicle windshield, as opposed to being supported from the rear of the module. Beyond that illustrated, any redesigned module can contain the plurality of illuminating elements within the windshield attached body as previously shown in communication with the PCBA, along with the other components including at least one of an accelerometer or a vehicle on board diagnostic (OBD) system connected to the PCBA and a power supply operating said accelerometer and PCBA.

In the embodiment of FIG. 11 et seq., a redesigned illuminating supporting component is shown at 144 as an elongated strip shape and includes individual oval shaped pockets 146 which align with the individual LED illuminating elements 134 in order to broadcast the illumination forwardly through the open scoop portion 102 and through the windshield. As further best shown in the enlarged sectional views of FIGS. 17-18, the each of the LED illuminating elements configured upon the strip can includes first and second illuminating colors (see in particular at 148/150 in FIG. 16).

As shown in FIG. 15, a lens cover 152 is provided for attaching over the elongated illuminating support component 144. As with the first embodiment, the module (assembled halves 126/128) can be supported in a limited angularly adjustable range within the scoop portion and this includes pairs of end attached mounting bolts 154/156 and nuts 158/160 which mount through apertures (one of which is visible at 162) in the opposite side located support brackets 116 and 118, and further seating through apertures defined by pairs of mating end collars (at 164/166) associated with the assemblable module halves 126/128 along with the curved end profiles 122 and 124 for pivotally seating the forward portion of the rear attached component module.

Figure 16:
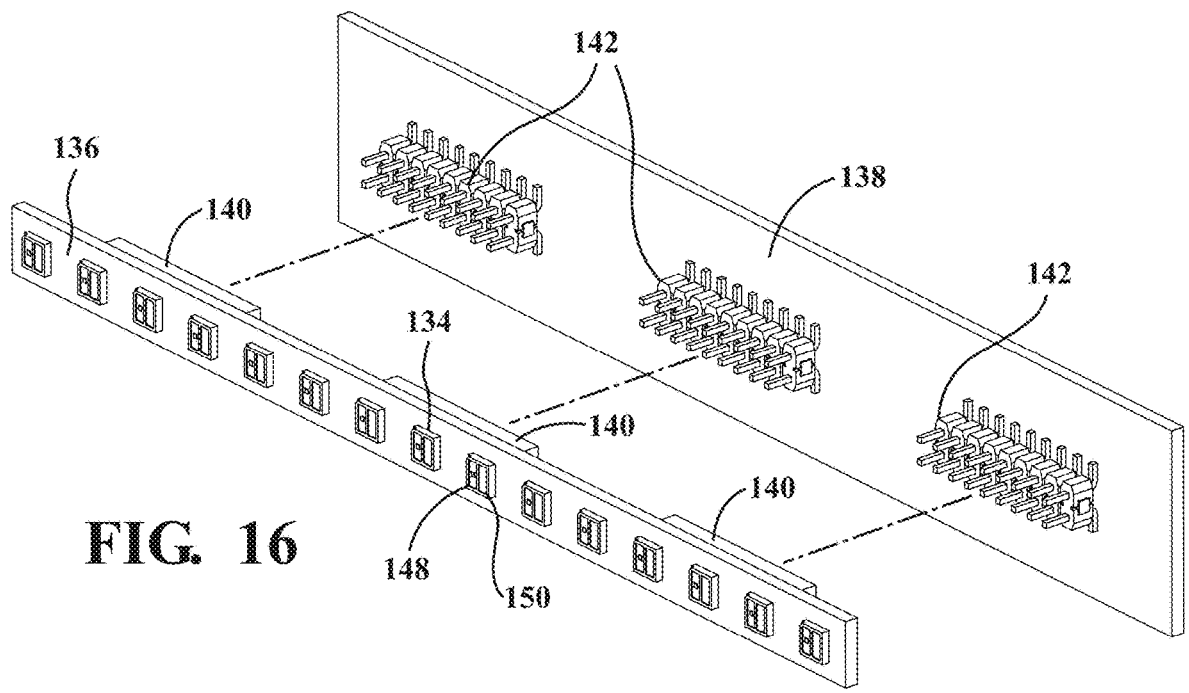
FIGS. 16 and 17 respectively depict exploded and assembled views of the PC board assembly with contact pins and LED supporting strip incorporated into the supported module.
Figure 17:
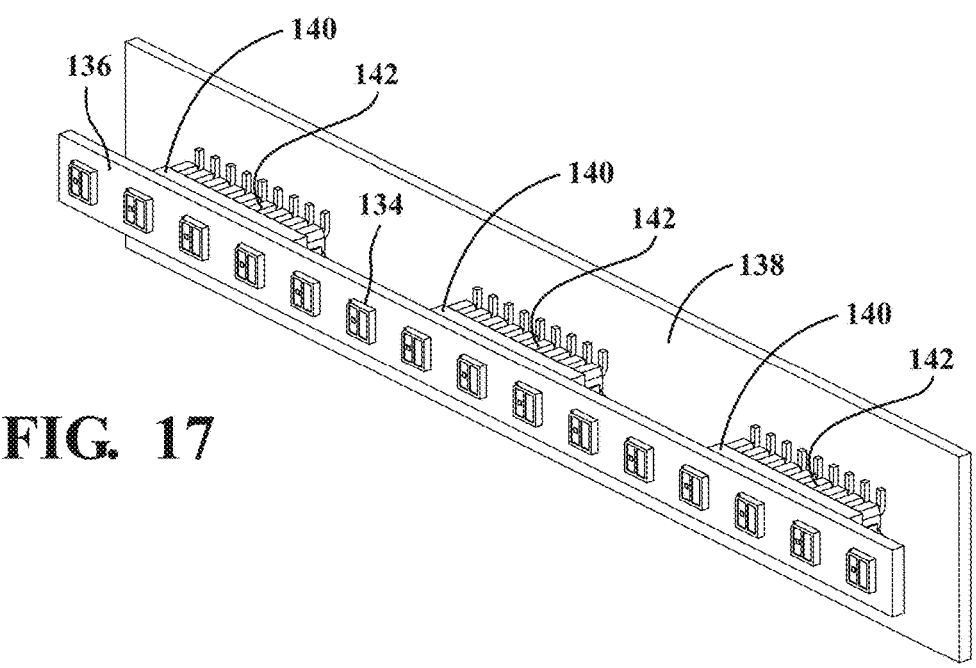
Figure 18:
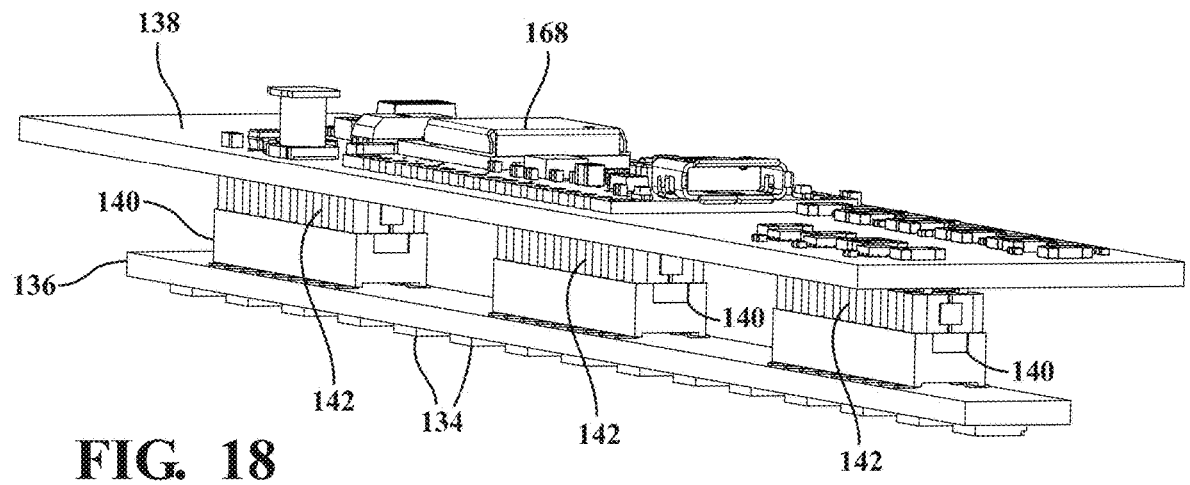
FIGS. 18 and 19 respectively depict assembled and exploded rotated views of the PCBA/LED supporting strip of FIGS. 16 and 17 and better depicting the PCBA supported components including accelerometer.
Figure 19:
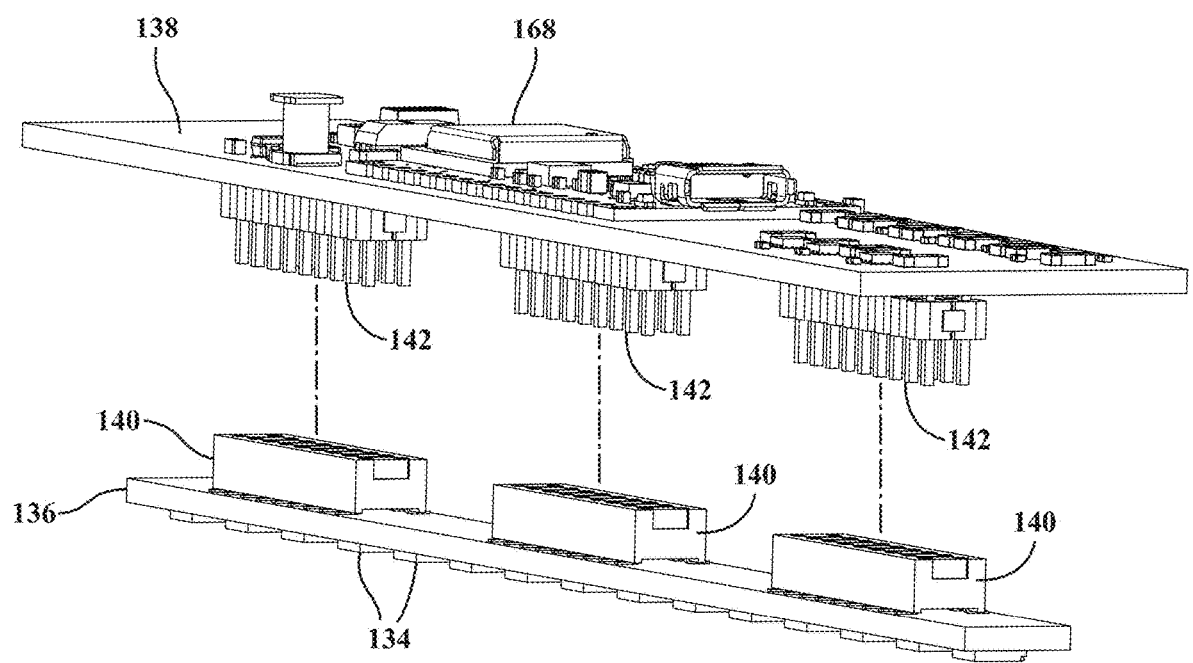

Referencing FIGS. 18 and 19, respectively depicted are assembled and exploded rotated views of the PCBA/LED supporting strip 136 of FIGS. 16 and 17, and better depicting the PCBA 138 supported components (see as generally depicted at 168 on a rear facing side of the PCBA 138) and which can again include an accelerometer and other functionality).

As is further known, LED's are a subset of electroluminescent lamps, which are generally defined as devices which convert electrical energy into light or luminescence, with the term luminescence generally associated with solids that generate light. In the case of electroluminescence, an electric field (voltage) applied to a thin phosphor layer produces light. Without limitation, the LEDs can be substituted with any other suitable illuminating elements within the scope of the present invention.

An electrical power supply (such as originating from a vehicle battery) is provided to the PCBA and accelerometer, as depicted in either embodiment. In a further application, a portable battery supply (not shown) is provided for powering the PCBA, accelerometer and LEDs, and which can be integrated into a compartment (not shown) associated with the vehicle headliner (not shown).

As is further known, the accelerometer is a device that measures the vibration, or acceleration of motion of a structure. The force caused by vibration or a change in motion (acceleration) causes the mass to "squeeze" the piezoelectric material, which produces an electrical charge that is proportional to the force exerted upon it. Since the charge is proportional to the force, and the mass is a constant, then the charge is also proportional to the acceleration.

In this manner, an accelerometer works using an electromechanical sensor to measure dynamic acceleration, defined as non-uniform acceleration forces when compared to its previous state. The theory behind accelerometers is that they can detect acceleration and convert it into measurable quantities like electrical signals.

In operation, the PCBA instructs a first visual output by the respective illuminating elements representative of a first steady or accelerating movement condition (this generally representing to the forward located observer that the vehicle is traveling a steady motion), with a second instructed visual output further representative of a decelerating or braking condition (as well as any other speed-reducing condition) of the subject vehicle.

The visual outputs envisioned by the present invention can include a number of different representations presented by the LEDs or other suitable electroluminescent elements, a first of which can include providing the first output in a first color (such as including but not limited to white), with the second output provided in a second color (such as further including but not limited to yellow or amber). It is further envisioned and understood that the first and second visual representations can be provided according to any of varying illumination intensities, flashing patterns, or the like, such further utilizing any of multiple different colors or a single color.

Additional features can include the provision of an ambient light sensor (also termed ALS) for managing an intensity of the illuminating/LED elements based upon exterior lighting conditions. By definition, an ALS is a photodetector that is used to sense the amount of ambient light present and, in response, adjusting the output intensity of the lights to match the ambient environment.

In operation, ambient light sensors (ALS) detect the amount of light in the environment and are used by systems that need this information such as headlight controls, interior lighting controls, and climate controls. Light sensors are generally based on one of three types of components: photoresistors, photodiodes or phototransistors.

Photoresistors or Photocells are two terminal components, and (as the name implies) the resistance between these terminals varies depending on the amount of light striking the component face. The resistance is proportional to changes in light intensity. However, they are relatively inaccurate and have a property called light "memory" which makes its response to a given light level dependent on previous ambient light levels. Photoresistors require external calibration in all but the simplest applications due to the variation in sensitivity between units and are generally the least expensive light detecting option and have a relatively slow (measured in milliseconds) response time.

Photodiodes are also two terminal components and are capable of developing a voltage across the terminals that is proportional to the amount of light striking the sensor surface. Photodiodes exhibit a linear relationship between their output current and the illumination level.

Phototransistors are two terminal transistors. The third terminal, the base in a bipolar transistor or the gate in a field-effect transistor, is replaced by the light collecting surface. The amount of light striking the surface supplies the base (or gate) current and regulates the amount of current that can flow from the collector to emitter (or source to drain). Phototransistors produce an output current proportional to the incident light intensity and are generally much faster than photoresistors and do not have the light "memory" property. However, the variation in sensitivity can be ±50% or more between units. Phototransistors are slightly more expensive than the other options, but they are more versatile and have quick (measured in nanoseconds) response times.

It is generally desirable for ambient light sensors to imitate the sensitivity of human eyes over the visual spectral range (380 nm to 780 nm with a peak response wavelength of about 550 nm). Unfortunately, most sensor's spectral response is not the same as the human eye because unlike the human eye, ambient light sensors generally respond to infrared (IR) and ultraviolet (UV) light as well. Therefore, displays and light brightness controlled by ambient light sensors may not be optimal for human eyes if IR light is not properly compensated. This issue can be addressed by self-compensating circuits or by using an IR filter within the unit.

Ambient light sensor products are gaining popularity as effective solutions for power management and increasing display quality in electronic products and systems. The battery life for portable electronics such as a cell phone or power savings in headlights can be increased significantly by automatic brightness control through ambient light sensor feedback.

Further to the above-description, and beyond that shown, the ALS can be located upon any of numerous locations including on the PCBA such as depicted at 130 in FIG. 15. Beyond that, the ALS can also be relocated to any of the laminated circuit or other existing automotive systems which is optimized for sensing the ambient lighting conditions and providing the necessary illumination adjustment to the illuminating elements/LED's.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A vehicle alert system for instructing observers as to movement of the vehicle, said system comprising:
   a body including a three dimensional scoop portion adapted to being attached to the vehicle, said scoop portion being open along its width extending rear supporting a separate module containing a plurality of illuminating elements visible from a front of said scoop portion and communicating with a printed circuit board assembly (PCBA);
   at least one of an accelerometer or a vehicle on board diagnostic (OBD) system connected to the PCBA;
   a power supply operating said accelerometer and PCBA;
   in response to a determined acceleration, said accelerometer or OBD inputting a signal to said PCBA which is representative of the vehicle movement; and
   said PCBA providing an output signal causing said illuminating elements to generate a visual output broadcasted forwardly through said scoop portion corresponding to said input signal.

2. The vehicle alert system of claim 1, said scoop portion further comprising a triangular shape having flattened upper edge extending perimeter portions which adhere against an inside surface of a front windshield of the vehicle.

3. The vehicle alert system of claim 1, said plurality of illuminating elements further comprising LED elements which are arranged so as to illuminate through a forward located lens subassembly integrated into a forward portion of said separate module which is seated within said scoop portion.

4. The vehicle alert system of claim 1, said visual output further comprising a first output representative of a steady or accelerating motion of the vehicle, and a second output further representative of a decelerating or braking condition of the vehicle.

5. The vehicle alert system of claim 1, further wiring connections extending from said illuminating elements to said PCBA.

6. The vehicle alert system of claim 1, further comprising said power supply being provided to said body and including additional connections extending between said PCBA and a battery of the vehicle.

7. The vehicle alert system of claim 1, said scoop portion and said separate module each further comprising a plasticized material.

8. The vehicle alert system of claim 1, further comprising said separate module establishing a limited range of angular adjustability relative to said scoop portion.

9. The vehicle alert system of claim 1, further comprising an ambient light sensor associated with said PCBA for managing an intensity of said illuminating elements based upon ambient lighting conditions.

10. A vehicle front alert system attached to a vehicle windshield for instructing observers as to movement of the vehicle, said system comprising:
- a body including a triangular shaped scoop portion having flattened upper edge extending perimeter portions which adhere, such as adhesively, against an inside surface of the front windshield;
- said scoop portion being open along its width extending rear for supporting a separate module containing a plurality of illuminating elements communicating with a printed circuit board assembly (PCBA);
- at least one of an accelerometer or a vehicle on board diagnostic (OBD) system connected to the PCBA;
- a power supply operating said accelerometer and PCBA;
- in response to a determined acceleration of the structure, said accelerometer or OBD inputting a signal to the PCBA which is representative of the vehicle movement; and
- said PCBA providing an output signal causing said illuminating elements to generate a visual output broadcasted forwardly through said scoop portion corresponding to said input signal.

11. The alert system of claim 10, said plurality of illuminating elements further comprising LED elements which are arranged so as to illuminate through a forward located lens subassembly integrated into a forward portion of said separate module which is seated within said scoop portion.

12. The vehicle front alert system of claim 10, said visual output further comprising a first output representative of a steady or accelerating motion of the vehicle, and a second output further representative of a decelerating or braking condition of the vehicle.

13. The vehicle front alert system of claim 10, further wiring connections extending from said illuminating elements to said PCBA.

14. The vehicle front alert system of claim 10, further comprising said power supply being provided to said body and including additional connections extending between said PCBA and a battery of the vehicle.

15. The vehicle front alert system of claim 10, said scoop portion and said separate module each further comprising a plasticized material.

16. The vehicle front alert system of claim 10, further comprising said separate module establishing a limited range of angular adjustability relative to said scoop portion.

17. The vehicle front alert system of claim 10, further comprising an ambient light sensor associated with said PCBA for managing an intensity of said illuminating elements based upon ambient lighting conditions.

18. A vehicle alert system secured to a vehicle windshield for instructing forward located observers as to movement of the vehicle, said system comprising:
- a body adapted to being attached along perimeter locations to an inner surface of the windshield;
- a module containing a plurality of illuminating elements incorporated into said body communicating with a printed circuit board assembly (PCBA);
- at least one of an accelerometer or a vehicle on board diagnostic (OBD) system connected to the PCBA;
- a power supply operating said accelerometer and PCBA;
- in response to a determined acceleration, said accelerometer or OBD inputting a signal to said PCBA which is representative of the vehicle movement; and
- said PCBA providing an output signal causing said illuminating elements to generate a visual output broadcasted forwardly through the windshield corresponding to said input signal.

19. The alert system of claim 18, said body further comprising a scoop portion having a triangular shape with flattened edge extending locations which adhere against an inside surface of a front windshield of the vehicle, said plurality of illuminating elements further including LED elements which are arranged so as to illuminate through a forward located lens subassembly integrated into a forward portion of said module which is seated within said scoop portion.

* * * * *